United States Patent [19]

Wristen

[11] 4,103,141
[45] Jul. 25, 1978

[54] WELD MONITOR

[75] Inventor: Cecil C. Wristen, York, Pa.

[73] Assignee: Allis-Chalmers Corporation, Milwaukee, Wis.

[21] Appl. No.: 799,386

[22] Filed: May 23, 1977

Related U.S. Application Data

[63] Continuation of Ser. No. 643,319, Dec. 22, 1975, abandoned.

[51] Int. Cl.² .............................................. B23K 9/10
[52] U.S. Cl. ................................................. 219/130.01
[58] Field of Search ............... 219/60 A, 137 PS, 135, 219/131 R, 109, 131 WR, 131 F, 130.01; 324/123 R, 123 C

[56] References Cited

U.S. PATENT DOCUMENTS

| | | | |
|---|---|---|---|
| 3,034,057 | 5/1962 | Ferguson | 219/109 |
| 3,165,694 | 1/1965 | Young | 324/123 R |
| 3,303,423 | 2/1967 | Straschover et al. | 324/123 R |
| 3,530,359 | 9/1970 | Grist | 219/135 |
| 3,532,853 | 10/1970 | MacKinney et al. | 219/135 |
| 3,679,865 | 7/1972 | Jesmitzer et al. | 219/131 R |
| 3,725,637 | 4/1973 | Wenrich et al. | 219/137 PS |
| 3,767,890 | 10/1976 | Madden, Jr. | 219/60 A |
| 3,784,778 | 1/1974 | McPherson et al. | 219/60 A |
| 3,912,980 | 10/1975 | Crump et al. | 219/131 WR |

OTHER PUBLICATIONS

M. Schwartz, *Information Transmission, Modulation, & Noise*, 1970, pp. 84–91.

*Primary Examiner*—J. V. Truhe
*Assistant Examiner*—Clifford C. Shaw
*Attorney, Agent, or Firm*—Robert B. Benson

[57] ABSTRACT

A device for monitoring the electrical arc voltage and arc current being supplied by a welding apparatus. The device includes means, as for instance an electronic circuit, for integrating each electrical quantity being utilized over a selectively variable time period to provide a running weighted average indication of said quantity. The device also includes a means, as for instance an electronic circuit, to provide a memory so that a welder can measure his own parameters.

1 Claim, 5 Drawing Figures

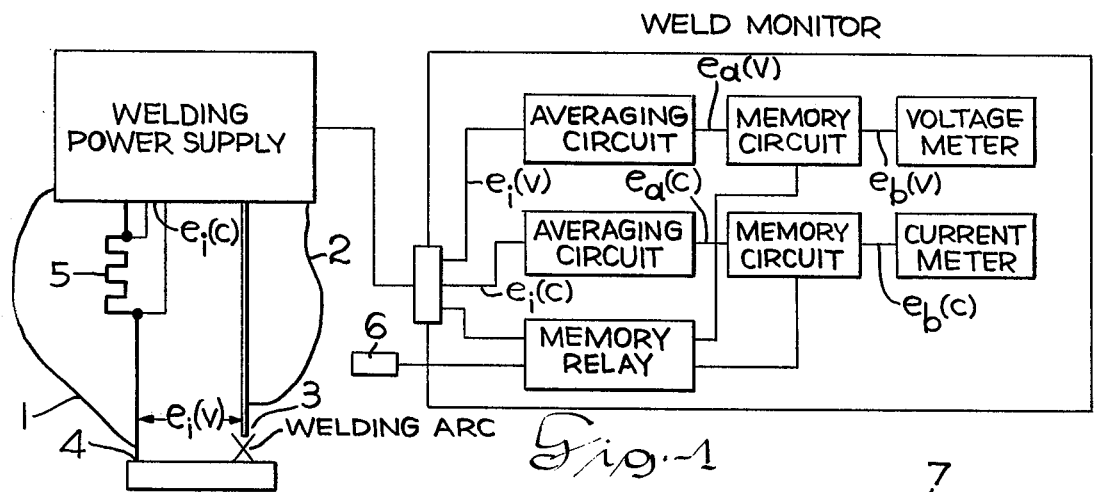
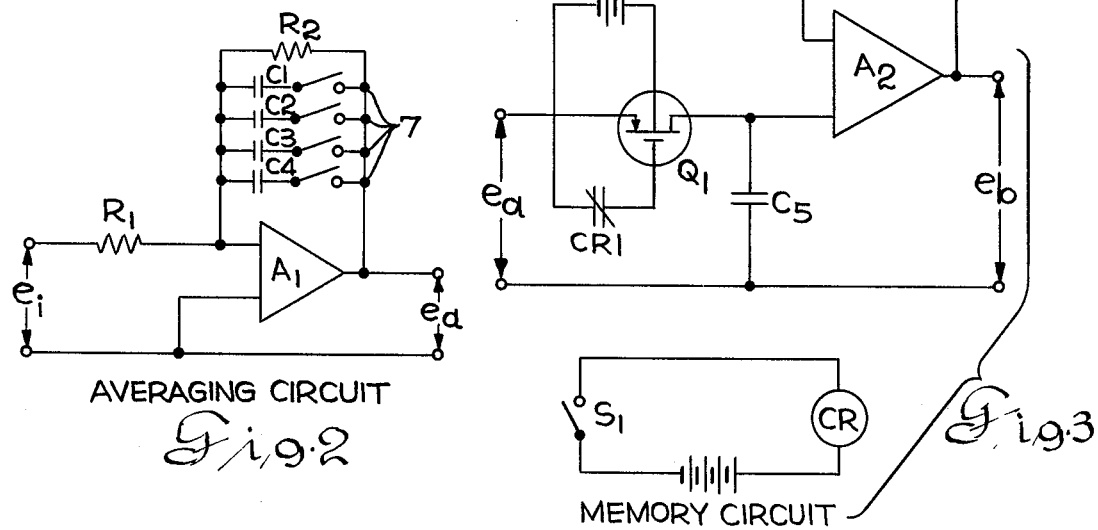
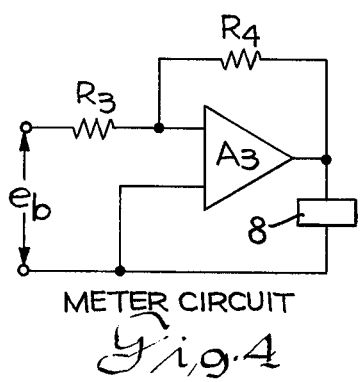
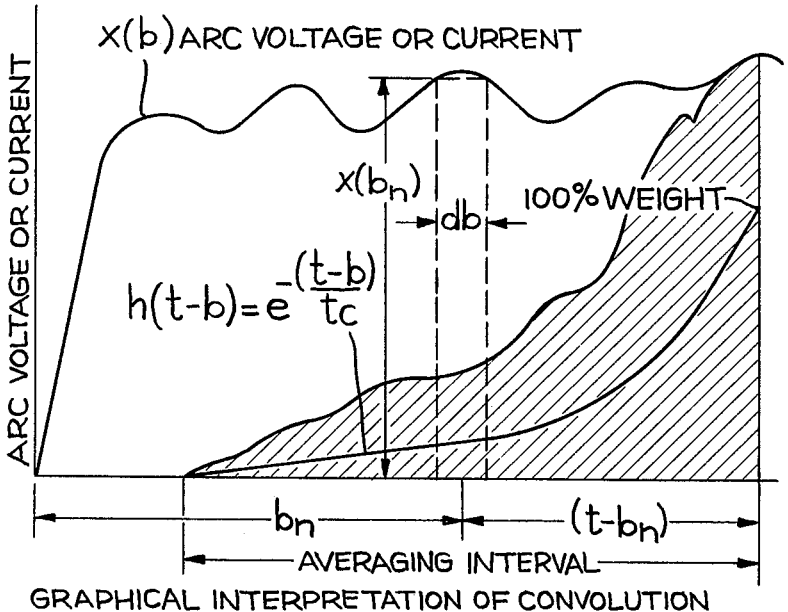

WELD MONITOR

This is a continuation of application Ser. No. 643,319 filed Dec. 22, 1975 now abandoned.

This invention pertains in general to a welding apparatus and more particularly to a device for indicating the average electrical arc current and arc voltage being supplied by the welding apparatus.

In many instances very precise welding procedures are required to insure integrity between the parts being jointed together by the welding operation. This is particularly true where nuclear components such as pressure vessels are welded. Two variables that have a direct effect on the weld quality are the arc current and arc voltage. The arc current and arc voltage supplied by the welding apparatus must be maintained within predetermined limits to insure a quality weld.

Maintaining control over weld quality requires the welding operator to record the average arc current and arc voltage being used for a weld. However, the indicating instruments currently available for measuring welding parameters record instantaneous readings of the arc current and voltage being utilized. The welding operator must visually observe the voltage and current readings on the meters as arc transients cause the meters to fluctuate between high and low readings. The fact that the meters fluctuate makes it necessary for the operator to estimate the average electrical values being supplied by the welding apparatus.

Furthermore, during critical manual welding operations the welder must verify that the proper arc current and voltage are being used as required by the welding procedure. That is, the welder must check the output of the welding apparatus. Since the operator of manual arc welding apparatus must wear an eye shield, he cannot see the meters to insure that proper arc current and voltage are being supplied. Prior to this invention it was necessary for the manual welder to obtain an assistant to read the meters while the operator struck an arc on a test plate. With the present invention a memory is provided which can be activated by the welder while he is welding. After he has completed the test weld the meter will indicate the average arc current and voltage at the time the memory circuit was activated by the welder. In this manner the welder can check and adjust the welding apparatus by himself.

It is, therefore, the intention and general object of this invention to provide a device which will indicate the average electrical arc current and arc voltage being supplied by the welding apparatus, and thereby assure that the welding is being done in accordance with the welding procedure.

An additional object of the subject invention is to provide a device of the hereinbefore described type with an electronic circuit which integrates the high and low welding arc current or voltage transients over a selectively variable time interval to provide an average electrical indication thereof.

An additional object of the subject invention is to provide a device of the hereinbefore described type wherein the integrating function is performed over a predetermined time interval and the younger electrical arc voltage and current transients are given a greater weight in determining the running average than the older arc transients.

A further object of the subject invention is to provide a method of monitoring the arc current and voltage being supplied by welding apparatus which includes damping out the high and low arc voltage and current transients and providing an average electrical power reading.

Another object of the subject invention is to provide a method of the hereinbefore described type wherein the instantaneous values of arc current and voltage are integrated over a selectively variable time interval to provide a steady average reading thereof.

Another object of the subject invention is to provide a device of the hereinbefore described type with a memory which can be activated by the welder while welding to store the average vaue of arc current and voltage and which can be recalled after the welding operation is stopped.

These and other objects of the subject invention will become more fully apparent as the following description is read in light of the attached drawing wherein:

FIG. 1 is a block diagram of a weld monitor connected to a welding apparatus in accordance with the subject invention;

FIG. 2 shows a typical electronic circuit which can be utilized to provide an average arc current and voltage reading;

FIG. 3 shows a typical memory circuit;

FIG. 4 shows a typical voltage and current meter circuit; and

FIG. 5 is a graphical interpretation of the arc current and voltage averaging.

The weld monitor of this invention is designed so that it computes the average arc voltage or arc current supplied by a welding apparatus and gives this average reading on the indicating meters provided on the weld monitor. The purpose of averaging is to eliminate the necessity of visually estimating the average value from an erratically fluctuating meter. The fundamental engineering principle used in the computation of the average value of the arc voltage or arc current is to use the convolution integral to compute a weighted running average. The convolution integral is:

$$y(t) = S \int_{b=-\infty}^{b=t} [X(b)db]h(t-b)$$

or equivalently where * symbolizes convolution:

$$y(t) = X(t)*h(t)$$

When these equations are used to describe the operation of the weld monitor, they have the following meaning:

$y(t)$ is the weighted running average of the arc welding current or voltage measured at time $t$.

$t$ is the time at which the arc current or voltage are measured, $S$ is a scale factor, $b$ is the variable of integration, $h(t-b)$ is the function which establishes the weight of the running average of the arc current or voltage. The form of the function $h(t-b)$ is:

$$h(t-b) = e^{\frac{-(t-b)}{t_c}}$$

$t_c$ is the time constant of the measuring system, and it establishes the averaging interval. The time constant is not itself the averaging interval. The averaging interval is the settling time of the metering system.

The effect of convolution on the measurement of arc voltage of current is shown by the graphical interpretation of convolution in FIG. 5. The convolution integral mathematically treats the arc current or voltage as a sequence of many individual impulses at various times $t - b_n$ where $n = 1,2,3,4,...\infty$. For purposes of explanation, only one impulse is shown in FIG. 5. The convolution integral asks each impulse its height $X(b_n)$ and its age $(t-b_n)$. A weight factor is assigned to each impulse by weight function. The weight function is shown in FIG. 5 and it diminishes from 100% at the time the measurement is taken to 0% at $b = -\infty$. Thus, young impulses are weighted heavily while old impulses receive hardly any weight at all. The convolution integral computes the product of the arc current or voltage and the weight function and integrates the area under the curve. This is shown as the crosshatched area in FIG. 5. The weighted running average of the arc current or voltage is this area divided by a scale factor.

The weld monitor preferably has selectible averaging intervals of 3, 7, 11 and 15 seconds. This range allows the optimum averaging interval to be matched to the arc stability of each welding process. The averaging interval is the settling time for the meter when the meter is subjected to a step function. Long intervals have the advantage that they average out larger swings in arc current or voltage, but they also have the disadvantage that a longer time is required to establish the initial reading. The optimum averaging time is the shortest time which results in a stable reading.

FIG. 1 shows a block diagram of the weld monitor connected to the electrical power supply for the welding apparatus. The instantaneous arc voltage $e_{i(v)}$ fed into the voltage averaging circuit is taken from the power supply by measurement leads 1 and 2 which are connected to the welding torch 3 and ground 4. The voltage averaging circuit integrates the instantaneous arc voltage and provides an average voltage $e_{a(v)}$ signal to the meter circuit. The reading on the voltage meter is thereby maintained in a stable condition and indicates the average voltage being drawn by the welding torch.

The instantaneous arc current signal $e_i(c)$ is obtained from a shunt 5 and in like manner is fed into the arc current averaging circuit. The arc current averaging circuit integrates the instantaneous arc current signal and provides an average arc current signal $e_a(c)$ to be fed into the meter circuit. As with the voltage meter, the current meter reading is stable and indicates the average current being drawn by the welding torch.

A typical electronic arc current and arc voltage averaging circuit is shown in FIG. 2. The signal input $e_i$ is taken from either the shunt 5 $e_{i(c)}$ or from the power supply across the welding arc by leads 1 and 2 $e_{i(v)}$, depending on whether current or voltage is being measured. The steady state value of the output signal $e_a$ from the averaging circuit is equal to the input signal $e_i$ times the ratio of resistance $R_2$ over $R_1$. The time interval that it takes the input signal to attain this steady state output value is determined by which one of the capacitors C1, C2, C3 or C4 is connected into the circuit by closing one or more of the switches 7. Each capacitor provides a different time constant for the input signal $e_{i(c)}$ or $e_{i(v)}$ to attain the steady state output signal value $e_a$ and, in effect provide a different slope of the curve designated $$h(t - b) = e^{\frac{-(t-b)}{t_c}}$$

in FIG. 5. The capacitors $C_1$, $C_2$, $C_3$ and $C_4$ may be connected in parallel to provide different values of capacitance and will thus change the RC time constant and time required for the output signal $e_a$ to reach the steady state average value. Signal $e_i$ is applied through an input resistance $R_1$ to an input of operational amplifier $A_1$ which sums the current at its input and tends to maintain zero volts at its input so that current flows into feedback resistance $R_2$. The feedback capacitor $C_1$ (or $C_2$, $C_3$ or $C_4$) absorbs the fluctuations in $e_i$ and charges at a rate determined by the RC time constant and thus changes the slop of the $h(t-b)$ curve and the exponential weight factor given each pulse of arc current or arc voltage. As previously mentioned, the time constants for the different capacitors are preferably 3, 7, 11 and 15 seconds. Means in the form of switches 14 are provided on the weld monitor for the operator to select the appropriate time constant.

FIG. 3 shows a typical memory circuit utilized to record the average arc current and voltage. The capacitor $C_5$ performs the memory function of the memory circuit. It is able to perform this function because it can charge to a given voltage and retain that voltage after the capacitor is disconnected. The field-effect-transistor $Q_1$ serves as a switch to connect and disconnect the capacitor from the averaging circuit. The operational amplifier $A_2$ is a measurement circuit which enables the voltage of the charge on the capacitor to be measured without discharging the capacitor.

The memory circuit functions in the following manner. Initially the pendant switch $S_1$ is in the reset position and relay CR is de-energized. Relay contacts CR1 are closed and a negative bias voltage is supplied to the gate of the field effect transistor. With the transistor $Q_1$ negatively biased, the transistor is like a closed switch; and $e_a$ from the averaging circuit is connected directly to capacitor $C_5$. The capacitor charges to the applied voltage and tracks the voltage $e_a$. When the menory is activated, relay CR is energized opening contact CR1. This removes the bias voltage from the transistor gate, and the transistor switches to an open state. Since capacitor $C_5$ is no longer connected to $e_a$, the capacitor remains charged at the voltage $e_a$ which existed at the moment the transistor $Q_1$ was switched open. Operational amplifier $A_2$ is connected so that it provides a voltage output which is equal to the voltage on the capacitor. The operational amplifier feedback loop 7 causes the amplifier to have a high input impedance so that in its measuring of the capacitor $C_5$ voltage the amplifier does not discharge the voltage on the capacitor and erase the memory.

FIG. 4 shows a typical electronic meter circuit. The average voltage $e_{b(v)}$ or current signal $e_{b(c)}$ from the memory circuit is fed through an input resistance $R_3$ into the inverting input of an operational amplifier $A_3$ which matches the average voltage or current to the meter 8 and provides the proper polarity and scale factor of the signal for the meter. The reading of the digital panel meter is a function of the average signal input signal times the ratio of resistance $R_4$ or $R_3$.

The remote pendant 6 contains the memory switch $S_1$ which is part of the memory circuit. When a welder who is manually welding wishes to verify that he is using the correct arc voltage and current he strikes an arc. After a time lag equal to the settling time selected by the welder the meters indicate the average voltage and current output of the welding machine. However, since the welder has an eye shield he cannot see the meters. He, therefore, activates the memory circuit with the remote pendant which he holds in his hand while welding. After the arc is extinguished the welder can read the voltage and current which is being supplied when the memory circuit was activated. He can then adjust the welding apparatus to insure the arc current and arc voltage are within the parameters prescribed for the particular welding operation. The remote pendant and memory circuit permits the operator to check the output of the welding apparatus by himself without assistance from another person. It should be understood that while a recallable memory circuit is shown in the drawing a print-out of the arc voltage and current could be used to accomplish the same result. However, a print-out feature would be more expensive.

From the above description of the invention, it can be appreciated that an improved weld monitor has been disclosed which is a significant improvement over the presently available meters being used in the welding industry for the measurement of arc current and arc voltage. The weld monitor disclosed herein indicates the average arc current and average arc voltage directly rather than the fluctuating instantaneous arc current and voltage indicated by known apparatus.

The disclosed electronic memory also is a feature which has not previously been available on voltmeters and ammeters used in the welding industry. This feature will save time and improve quality control by making the checking of arc current and voltage more convenient.

The embodiments of the invention in which an exclusive property or privilege is claimed are defined as follows:

1. A weld monitor for utilization with a welding apparatus having an arc torch and provided with a meter having a current indicating section including a dial and a voltage indicating section including a dial to permit an operator to check the output of the welding apparatus by himself;

a power supply for the welding apparatus;

a voltage averaging circuit electrically connected to receive an instantaneous arc voltage from the power supply as supplied to the arc torch, said voltage averaging circuit being operable to integrate the instantaneous arc voltage and provide an average voltage signal;

circuit means electrically connecting said voltage averaging circuit to the voltage indicating section of said meter;

a current averaging circuit electrically connected to receive an instantaneous arc current signal, said instantaneous arc current being obtained from a shunt connected across the torch, said current averging circuit being operable to integrate the instantaneous arc current and provide an average current signal;

circuit means electrically connecting said current averaging circuit to the current indicating section of the meter;

an average arc current memory circuit and an average arc voltage memory circuit electrically connected to receive the average arc current signals and average voltage signals from their respective averaging circuits, said memory circuits being identical and each comprising a capacitor electrically connected to receive the average signal, a field effect transistor interposed between the capacitor and the average signal input thereto, said transistor serving as a switch to connect and disconnect the capacitor from the averaging circuit; a measurement circuit including an operational amplifier electrically connected to permit the charge on said capacitor to be measured without the capacitor being discharged; and switch means to activate said memory circuits including a relay having a normally closed contact in circuit with said field-effect transistor; said relay when energized by the closing of said switch operating to open its normally closed contact to thereby interrupt the reactive bias voltage on the field-effect transistor so that the field-effect transistor switches to an open state, said capacitor in said memory circuit remaining charged at the voltage which existed at the moment that the field effect transistor of said memory circuit was switched to an open state and said operational amplifier provides a voltage output which is equal to the voltage on the capacitor, and a feed back loop in the memory circuit operable to cause the amplifier to have a high input impedance so that voltage on the capacitor is not discharged when the amplifier is measuring the voltage on the capacitor to thereby maintain the memory.

* * * * *